July 12, 1932.　　　G. T. JOHNSON　　　1,867,267
CAR TRUCK
Filed Aug. 29, 1929　　　3 Sheets-Sheet 1
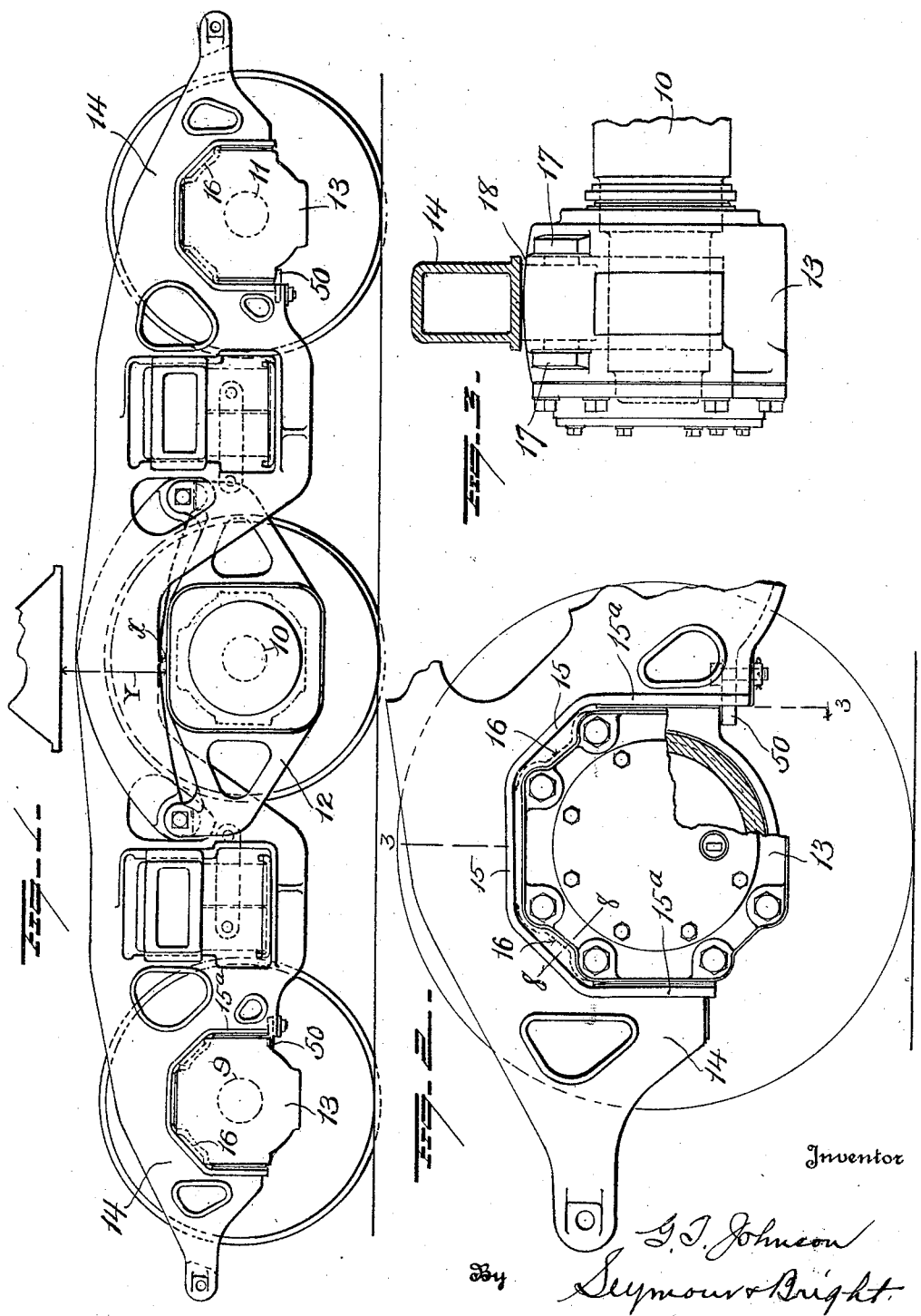
Inventor
G. T. Johnson
By Seymour & Bright
Attorneys

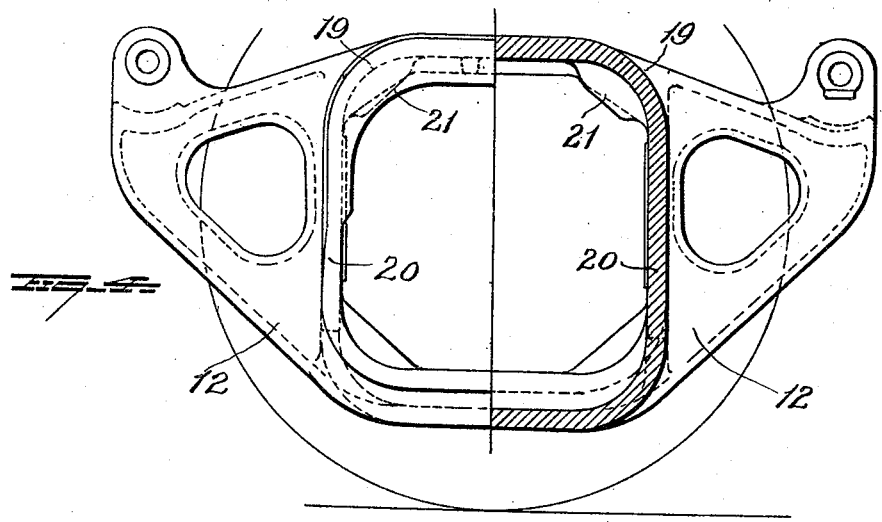
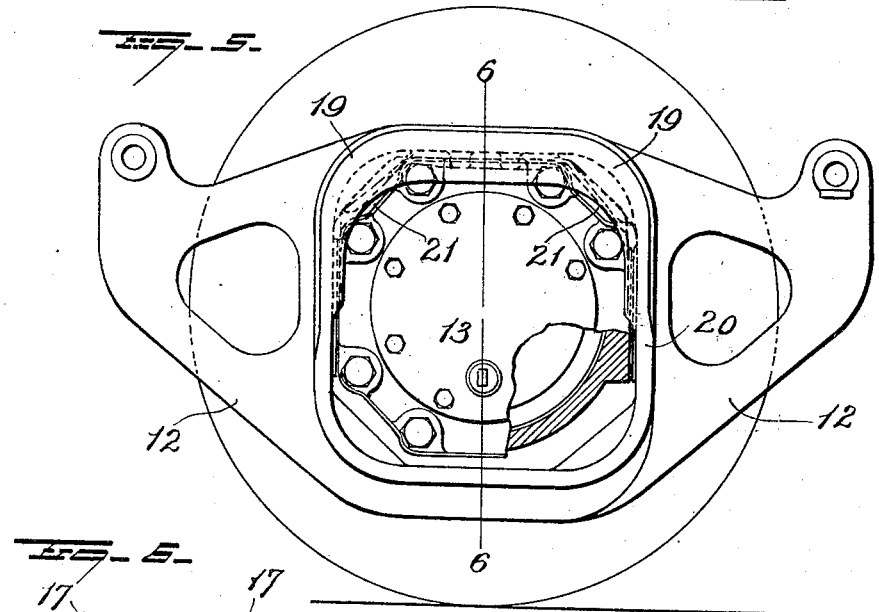
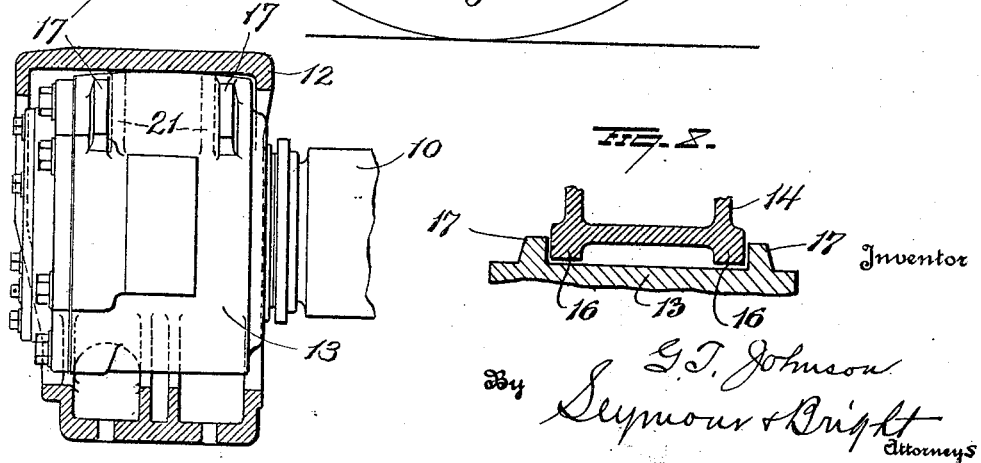

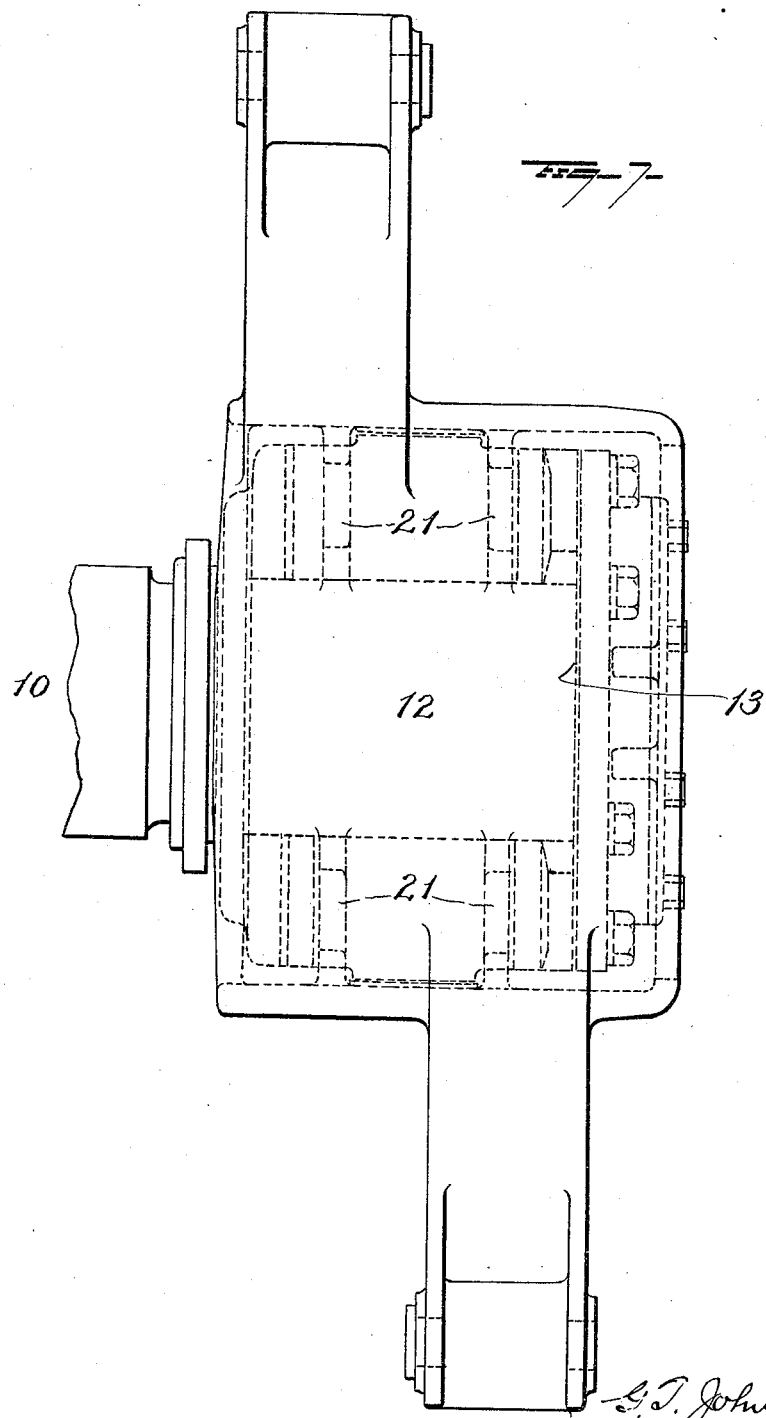

Patented July 12, 1932

1,867,267

UNITED STATES PATENT OFFICE

GEORGE T. JOHNSON, OF COLUMBUS, OHIO, ASSIGNOR TO THE BUCKEYE STEEL CASTINGS COMPANY, OF COLUMBUS, OHIO

CAR TRUCK

Application filed August 29, 1929. Serial No. 389,233.

This invention relates to car trucks, and more especially to means for facilitating the placement of either plain or anti-friction bearings therein and the interlocking of the housings of such bearings therewith.

The primary object of the invention is to provide a car truck including either an anti-friction bearing or plain bearing, and in whch the bearing housing is so connected with a side frame, or a portion of a side frame of a truck as not to interfere with the movement of certain parts, or to necessitate any increase in the height of the frame or any decrease in the strength of the frame, even though an anti-friction bearing is substituted for a plain bearing.

Another object is to so combine an anti-friction bearing with the side frame of a truck, as to permit angular flexibility without having any part projecting upwardly above the crown of the bearing.

With the foregoing objects outlined, and with other objects in view which will appear as the description proceeds, the invention consists in the novel features hereinafter described in detail, illustrated in the accompanying drawings, and more particularly pointed out in the appended claims.

Referring to the drawings,

Fig. 1 is a side elevation of a six-wheel truck with which the invention may be used.

Fig. 2 is a similar enlarged view, partly in section, of one end portion of the truck.

Fig. 3 is a vertical sectional view on the line 3—3 of Fig. 2.

Fig. 4 is a side elevation, partly in longitudinal vertical section, of the central member or equalizer of one of the side frames of the truck.

Fig. 5 is a similar view, but showing an anti-friction bearing housing arranged within the opening of the equalizer.

Fig. 6 is a transverse vertical sectional view on the line 6—6 of Fig. 5.

Fig. 7 is an enlarged top plan view of the structure shown in Figs. 5 and 6.

Fig. 8 is a transverse vertical sectional view of a portion of the frame, taken on the line 8—8 of Fig. 2.

Heretofore, in six-wheel trucks of the type shown in United States Patent 1,079,199, dated November 18, 1913, only plain friction type bearings have been used. However, on account of the developments leading toward the use of frictionless or roller bearings, I have devised means for adapting such trucks for the application of any type of roller bearing, as well as the friction bearing.

The important feature of the six-wheel truck, in the above mentioned patent, is the equalized load distribution to the three axles 9, 10 and 11, which is effected by the equalizer members 12, (one at each side of the truck), supported on the center axle. Fig. 1 illustrates how the ends or arms of the members of the side frames overlap each other over the equalizer 12, and how the equalizer, in performing its function, is free to oscillate about the center axle. Such oscillation requires clearance over the equalizer, for the movement of the arms, as indicated by the arrow X. It will be noted at this time that roller or anti-friction bearings, as compared with friction bearings, require more space over the axle journal, for anti-friction bearings have a larger radius than the conventional friction bearings. This enlargement of the bearing, together with the proximity of the overlying car body parts, restricts very materially the space above the bearing parts, as is clear by reference to the arrow Y in Fig. 1. It is very important to conserve this vertical space in order to provide the necessary strength in the frame arms and at the same time provide the necessary clearance for the proper operation of the truck.

Fig. 2 illustrates the application of a roller bearing 13 to a pedestal jaw 14 in the truck side frame which is shaped to interlock with the box or housing of either a plain or anti-friction bearing, and it will be observed that no part of the housing or the bearing 13 extends outside the general outline of the flange 15, which defines the jaw opening, and includes vertical parallel portions $15^a$ that are adapted to interlock with flanges at the opposite sides of a plain bearing housing (not shown) when such a plain bearing is used instead of a frictionless bearing. In such a structure, lateral displacement of the antifriction bearing 13 with reference to the frame, is prevented by the 45° lugs 16, (see Fig. 8), which cooperate with corresponding lugs 17 (Fig. 3), or recesses in the housing of the bearing 13.

The commonly used method of retaining a bearing housing in its proper relation to the truck side, is to have flanges on the housing extending beyond the general outline of the jaw opening, as defined by the flange 15, and it will be observed that in my construction, when an anti-friction bearing is used, there are no flanges projecting from the housing outwardly beyond said flange 15.

It will be noted by referring to Fig. 3, that the top of the bearing housing is rounded or crowned, as shown at 18, to provide angular flexibility, and that outstanding or projecting lugs or flanges on the bearing housing for the purpose of preventing lateral displacement, would only be effective near the top of the housing, inasmuch as freedom for angular motion must be allowed in proportion to the distance below the crowned bearing.

If flanges were arranged across the top of the bearing housing, it is obvious that they would consume some of the restricted space above the journal of the center axle, inasmuch as it is very desirable to use the same bearing housing construction throughout the truck. Of course, flanges across the top of the bearing housing of the center axle, could fit into slots in the top of the equalizer 12, without encroachment on the vertical space, but this would impair the strength of the equalizer.

To meet these problems, I have advanced as follows: In the inside upper corners 19 of the equalizer box 20 (see Figs. 4 to 7 inclusive), I have provided 45° lugs 21, which correspond exactly with the lugs 16 in the pedestal jaws 14. These lugs 21, like the lugs 16, cooperate with the lugs or flanges 17 of the bearing housings of the central axle, and they not only hold the central bearings in position, but they also serve as effective reinforcements to the equalizer structure as a whole.

By the construction here described, I am able to adapt a six-wheel or other truck to take the enlarged or anti-friction bearings throughout in substitution for plain bearings, without impairing the strength of the truck, or its flexibility.

By way of reiteration, it may be noted that in accordance with my invention, bearings of uniform construction may be employed with each or some of the axles, and that the retaining lugs 16, 21, which interlock the housings of these bearings with the members of the side frames and equalizers will all project toward the bearings instead of having lugs on the housings of the bearings (like plain bearings), projecting outwardly beyond the outlines of the openings in the side frames.

It will also be again noted that I have devised a side frame which is adapted to interlock with the housings of plain or anti-friction bearings. By "interlock" I mean a structure in which the side frame and bearing housing have surfaces or abutments which lock these parts together when they are brought into proper engagement, without operating any auxiliary means which is movably mounted on or movably connected with either the frame or bearing housing. Such auxiliary locking means may, of course, be used if desired (see 50, Figs. 1 and 2) but they form no part of the interlocking means claimed therein.

While the invention has been described with specific reference to six-wheel trucks only, it is manifest that this idea may be utilized with various types of trucks, and I therefore do not desire to restrict its application to any particular kind of truck.

From the foregoing it is believed that the construction, operation and advantages of the invention may be readily understood, and I am aware that various changes may be made in the details disclosed, without departing from the spirit of the invention, as expressed in the claims.

What I claim and desire to secure by Letters-Patent is:—

1. In a car truck, a side frame having an inverted U-shaped opening therein, an anti-friction bearing housing extending into the opening, and portions of the side frame projecting into the bearing housing.

2. In a car truck, a side frame member having an inverted U-shaped opening therein, an anti-friction bearing housing extending into the opening, and lugs on the frame member projecting into said housing.

3. In a car truck, a side frame member having an opening therein, a journal bearing housing in the opening and having its perimeter lying entirely within the boundary of the opening, and means interlocking the side frame member to the bearing housing, said means including coacting inclined lugs respectively depending from the side frame member and projecting from the bearing housing.

4. In a car truck, a side frame member having an inverted U-shaped opening therein, upwardly converging walls forming a portion of the walls of the opening, a journal bearing housing arranged within said opening, and means for interlocking the housing to the frame member, a part of the interlocking means being arranged on said converging walls.

5. In a car truck, a side frame member, having an inverted U-shaped opening therein, substantially 45° lugs arranged on walls of said opening, and an anti-friction bearing housing arranged in the opening and held in position by said lugs.

6. In a car truck, a side frame member having an inverted U-shaped opening therein partially defined by converging walls, lugs on said walls projecting into the opening, and an anti-friction bearing housing arranged in said opening and held in position by said lugs.

7. In a car truck, a side frame member having an opening therein, a bearing housing arranged in the opening and having a rounded crown bearing against the ceiling of said opening, means for interlocking the bearing housing to said frame member and arranged below said ceiling, a part of the interlocking means projecting from the frame member into the opening and another part being detachably connected to the side frame member.

8. In a car truck, a side frame member having an inverted U-shaped opening therein defined by upwardly extending walls which merge by means of converging walls, into a ceiling, and an anti-friction bearing housing arranged within the opening and provided on its converging walls with lugs which project into the opening and interlock the bearing housing to the frame member.

9. In a car truck, a frame member having an opening therein partially defined by converging walls, a journalled bearing housing having its perimeter arranged within the boundary of said opening and having converging surfaces juxtaposed to the converging walls, and inclined lugs for interlocking the frame member to the bearing housing, and arranged on said converging walls.

10. In a car truck, an equalizer frame member having an opening therein provided with diverging lugs, and a bearing housing arranged within said opening and held in position by said lugs.

11. In a car truck, a side frame equalizer member having oppositely projecting arms and a centrally disposed opening, diverging lugs on the frame member projecting into said opening, and an antifriction bearing housing arranged in the opening and held in position by said lugs.

12. In a car truck, a side frame equalizer member, having an opening therein, diverging lugs projecting from the frame member into the opening, and an anti-friction bearing housing arranged in the opening and held in position by said lugs.

13. In a car truck, a side frame equalizer member having a substantially rectangular opening therein, diverging lugs projecting into the opening from the upper corners of the opening, and an anti-friction bearing housing arranged in the opening and held in position by said lugs.

14. In a car truck, a side frame equalizer member having a substantially rectangular opening arranged therein, diverging lugs projecting into the opening from the upper corners of the latter, an anti-friction bearing housing arranged in the opening and held in position by said lugs, the top of the bearing housing being rounded and the lugs being positioned below said rounded portion.

15. In a car truck, side members having openings therein, diverging lugs on the side members projecting into said openings, and uniform anti-friction bearing housings detachably arranged in the openings and held in position by said lugs.

16. A six-wheel car truck comprising a side frame including a central equalizer member and end members, each of said members having an opening therein, some of the openings being inverted U-shaped and others substantially rectangular, lugs on each member projecting into its respective opening, and uniform anti-friction bearing housings arranged in the openings and retained in position by said lugs.

17. A six-wheel car truck comprising a central equalizer member and end members, each of said members having an opening therein, provided with diverging lugs, and uniform bearing housings arranged in said opening and retained in position by said lugs.

18. In a car truck, a side frame comprising a central equalizer member and end membrs, each of said members having an opening therein, diverging lugs on said members projecting into the openings from the upper portions thereof, and uniform bearing housings arranged in said openings and retained in position by said lugs.

19. A car truck including a side frame comprising a central equalizer member and end members, each of said members having an opening therein, diverging lugs projecting into the opening from said members, anti-friction bearing housings arranged in the openings and retained therein by said lugs, each housing having a rounded top, and the retaining lugs being arranged below said top.

20. In a car truck, a side frame member having an inverted U-shaped opening therein defined by a wall, opposite portions of said wall being provided with lugs which are positioned below the top limit of the wall and project into said opening, the wall below said lugs having substantially parallel opposite side portions.

21. In a car truck, a side frame equalizer member having oppositely projecting arms and a centrally disposed opening, diverging lugs on the frame member projecting into said opening, and an anti-friction bearing housing arranged in the opening and held in position by means including said lugs.

22. In a car truck, a side frame equalizer member having an opening therein, diverging lugs projecting into the opening from the upper portions of the latter, and an anti-friction bearing arranged in the opening and held in position by means including said lugs.

23. In a car truck, a side frame equalizer member having oppositely projecting arms and a centrally disposed opening, an anti-friction bearing housing arranged in the opening, and means interlocking the equalizer member to the bearing housing, portions of the side walls of the opening, opposite the axis of the bearing housing, being in close proximity to the side walls of the housing for limiting the lateral movement of said housing.

24. In a car truck, a side frame equalizer member having a substantially rectangular opening therein, diverging lugs projecting into the opening from the upper corners of the opening, and an anti-friction bearing housing arranged in the opening and held in position by means including said lugs.

25. In a car truck, side frame members having openings therein, uniform anti-friction bearing housings detachably arranged in the openings, some of the openings being inverted U-shaped and others substantially rectangular and means including engaging lugs interlocking the side frame members to the bearing housings.

26. In a car truck, side frame members having openings therein, uniform anti-friction bearing housings detachably arranged in the openings, some of the openings being inverted U-shaped and others substantially rectangular and means including engaging lugs interlocking the side frame members to the bearing housings, each bearing housing having its perimeter lying entirely within the boundary of the opening in which the housing is arranged.

27. A side frame for car trucks, consisting of two end members and a center member, each end member having an arm extending over the center member, and bearing on the latter at the far side thereof, an axle bearing carried by each of said members, axles journaled in said bearings, some of said bearings being of the anti-friction type, and quick-detachable means for securing the anti-friction type bearings in position, said means including coacting inclined lugs, some of which depend from one of the side frame members and others of which project from one of the bearing housings.

28. A side frame for car trucks comprising two end members and a center member, each end member having an arm extending over the center member and flexibly connected to the same at the far side thereof, an anti-friction axle bearing carried by each of said members, and quick-detachable means for securing the anti-friction axle bearings to said members, said means including coacting inclined lugs, some of which depend from one of the side frame members and others of which project from one of the bearing housings.

In testimony whereof, I have signed this specification.

GEORGE T. JOHNSON.